MECHANICAL ADVERTISING SIGN.
APPLICATION FILED SEPT. 24, 1910.

1,015,714.

Patented Jan. 23, 1912.

WITNESSES:

INVENTOR
Jacob Samuels
BY
ATTORNEYS

UNITED STATES PATENT OFFICE.

JACOB SAMUELS, OF NEW YORK, N. Y.

MECHANICAL ADVERTISING-SIGN.

1,015,714. Specification of Letters Patent. Patented Jan. 23, 1912.

Application filed September 24, 1910. Serial No. 583,602.

*To all whom it may concern:*

Be it known that I, Jacob Samuels, a citizen of the United States, and a resident of the city of New York, borough of Manhattan, in the county and State of New York, have invented a new and Improved Mechanical Advertising-Sign, of which the following is a full, clear, and exact description.

My invention relates to mechanical advertising signs, my special purpose being to produce a sign having fixed and movable parts, so arranged and manipulated as to present to the eye of the spectator a scene comprising a stationary vehicle provided with turning wheels and the representation of fixtures carrying various advertisements and movable past said vehicle.

More particularly stated, my invention comprehends a member representing a vehicle and made stationary but provided with wheels, mechanism for turning these wheels continuously, and a display belt forming a background for the vehicle and moving continuously, this belt carrying various advertisements.

Reference is to be had to the accompanying drawings forming a part of this specification, in which similar characters of reference indicate corresponding parts in both the figures.

Figure 1:
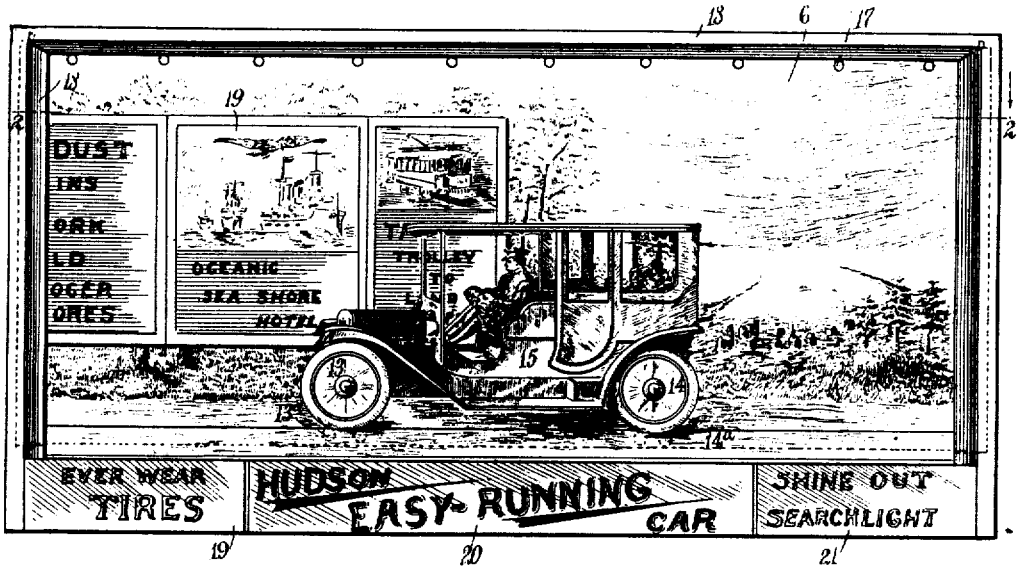
Figure 2:

Figure 1 is a front elevation showing my improved mechanical advertising sign complete; and Fig. 2 is a section on the line 2—2 of Fig. 1, looking in the direction of the arrow.

A housing 3 is erected and inside of it are mounted two rollers 4, 5, each being of considerable length and disposed vertically. A display belt 6, having considerable breadth, runs upon the rollers 4, 5. A driving belt 7 is connected with a motor 8 and with the roller 5. At 9 is another driving belt which reaches from the motor 8 to a shaft 10. By aid of this shaft two other belts 11, 12 are in operative communication with two wheels 13, 14 which are revoluble upon their own axes, but otherwise occupy general fixed positions.

The body of the vehicle is shown at 15 and the wheels 13, 14 are so positioned as to simulate the service wheels of this vehicle. At 13ᵃ, 14ᵃ are friction wheels upon which the wheels 13, 14 rest in part in order to partially support the weight of these wheels. At 17 are lamps which are protected by a cornice 18 with which the housing is provided. At 19, 20 are panels upon which are displayed various advertisements and legends.

The operation of my device is as follows: The various parts above mentioned being in their respective positions, as described, and the motor 8 being started up, motion is communicated to the rollers 4, 5 and thence to the display belt 6 and also to the wheels 13, 14. The display belt is thus carried continuously past the vehicle 15 and the wheels 13, 14 are rotated at a rate of speed commensurate with the travel of the display belt. The net result is that the vehicle appears to be traveling past the various advertisements and legends carried by the belt 16.

Having thus described my invention, I claim as new and desire to secure by Letters Patent:

1. A mechanical advertising sign, comprising a stationary member representing a vehicle and provided with wheels simulating the wheels of a vehicle, a display belt having a scenic representation thereon and movable past said member, the said belt being provided with advertisements, a motor, means for actuating said belt from the motor, a shaft mounted to turn, means for driving said shaft from the motor, and connections between the shaft and the wheels for turning the wheels.

2. A mechanical advertising sign, comprising a housing, rollers mounted therein, a display belt having a scenic representation thereon, the said belt being mounted upon said rollers and adapted to travel as said rollers are turned, a stationary member disposed adjacent to said display belt, and fashioned to represent a vehicle, said member being provided with revoluble wheels fashioned to simulate the wheels of said vehicle, friction wheels upon which the revoluble wheels rest, gearing connected with the shafts of the revoluble wheels for actuating the latter, gearing for turning one of said rollers, and motor mechanism connected with all of said gearing.

3. A mechanical advertising sign, comprising a housing, rollers mounted therein, a display belt having a scenic representation thereon, the said belt being mounted upon said rollers and adapted to travel as said rollers are turned, a stationary member disposed adjacent to said display belt and fashioned to represent a vehicle, the said member being provided with revoluble wheels fashioned to simulate the wheels of said vehicle, friction wheels upon which the revoluble wheels rest, a motor, a driving belt connecting the motor with one of said rollers, a shaft mounted to turn, a driving belt connecting the motor with said shaft, and belts connecting said shaft with the said revoluble wheels.

In testimony whereof I have signed my name to this specification in the presence of two subscribing witnesses.

JACOB SAMUELS.

Witnesses:
 WALTON HARRISON,
 PHILIP D. ROLLHAUS.

Copies of this patent may be obtained for five cents each, by addressing the "Commissioner of Patents, Washington, D. C."